(12) United States Patent
Xing et al.

(10) Patent No.: US 11,383,586 B2
(45) Date of Patent: Jul. 12, 2022

(54) AIR PURIFICATION APPARATUS, METHOD OF CONTROLLING THE APPARATUS, DEVICE OF CONTROLLING THE APPARATUS AND VEHICLE USING THE SAME

(71) Applicant: BEIJING XIAOMI MOBILE SOFTWARE CO., LTD., Beijing (CN)

(72) Inventors: Zheng Xing, Beijing (CN); Lei Zhang, Beijing (CN); Zhenhua Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 657 days.

(21) Appl. No.: 16/390,293

(22) Filed: Apr. 22, 2019

(65) Prior Publication Data

US 2019/0329631 A1 Oct. 31, 2019

(30) Foreign Application Priority Data

Apr. 28, 2018 (CN) .......................... 201810399173.3

(51) Int. Cl.
 *B60H 3/06* (2006.01)
(52) U.S. Cl.
 CPC .................................. *B60H 3/0641* (2013.01)
(58) Field of Classification Search
 CPC .. B60H 3/0641; B60H 1/245; B60H 1/00264; B60H 2003/0675; B60H 2003/0691;
 (Continued)

(56) References Cited

U.S. PATENT DOCUMENTS

| 6,425,629 B1 * | 7/2002 | Chubb ..................... A61N 5/06 296/215 |
| 2013/0181488 A1 * | 7/2013 | Kitani .................... B60J 7/0015 296/214 |

(Continued)

FOREIGN PATENT DOCUMENTS

| CN | 106080148 A | * 11/2016 | |
| CN | 107914546 A | * 4/2018 | ............... B60H 1/24 |

(Continued)

OTHER PUBLICATIONS

Extended European Search Report in EP 19169879.4-1012 dated Sep. 9, 2019.
EP NOA in Application No. 19169879.4, dated Oct. 15, 2020.

*Primary Examiner* — Robert A Hopkins
*Assistant Examiner* — Qianping He
(74) *Attorney, Agent, or Firm* — Syncoda LLC; Feng Ma

(57) ABSTRACT

An air purification apparatus for a vehicle includes a main body, and a solar module covering at least a portion of the main body and providing power to the main body. The main body is assembled on a sunroof of the vehicle, and includes a first passage connected with the sunroof of the vehicle. A cover plate is slidably assembled with the main body and capable of sliding along the main body to open or close the first passage. The main body further includes a purification module, an air inlet module having an air inlet passage capable of receiving air from outside the vehicle for the purification module to purify the received air, and an air outlet module having an air outlet passage configured to discharge air from inside the vehicle to outside the vehicle.

20 Claims, 8 Drawing Sheets

(58) Field of Classification Search
CPC .. B60H 3/00; B60H 2001/00099; B60H 1/24; B60H 3/06; B60H 3/0658; B60H 1/26; B60H 1/30; B01D 46/0027; B01D 46/429; B60J 7/057; B60J 7/043; B60J 7/08; B62B 9/14; B62B 9/142; B62B 2204/00

See application file for complete search history.

(56) References Cited

U.S. PATENT DOCUMENTS

| | | | |
|---|---|---|---|
| 2014/0083292 A1* | 3/2014 | Weiden | B01D 46/0086 95/25 |
| 2017/0273213 A1* | 9/2017 | Fournier | H05K 7/20545 |
| 2019/0160412 A1* | 5/2019 | Yang | F24F 8/10 |

FOREIGN PATENT DOCUMENTS

| | | |
|---|---|---|
| DE | 4222508 C1 | 8/1993 |
| FR | 2903345 A1 | 4/2011 |
| JP | H09-315138 A | 12/1997 |
| JP | 2001301451 A | 10/2001 |
| JP | 2007022354 A | 2/2007 |
| KR | 20150116800 A | 10/2015 |
| WO | 2017149442 A1 | 9/2017 |

\* cited by examiner

AIR PURIFICATION APPARATUS, METHOD OF CONTROLLING THE APPARATUS, DEVICE OF CONTROLLING THE APPARATUS AND VEHICLE USING THE SAME

CROSS-REFERENCE TO RELATED APPLICATIONS

This application claims priority to Chinese Patent Application No. 201810399173.3, filed on Apr. 28, 2018, the disclosure of which is hereby incorporated by reference in its entirety.

BACKGROUND

Air quality inside a vehicle directly influences the health and mood of a passenger. In the related art, it is usually to dispose an air purification apparatus inside the vehicle to circulate and purify the air inside the vehicle, so as to improve the air quality inside the vehicle. However, it is difficult to achieve desired effect simply by circulating and purifying the air inside the vehicle. Moreover, the installation position and power source type of the air purification apparatus can directly influence the purification effect. Therefore, how to improve the purification effect of the air purification apparatus in structure view has become a hot issue in current research.

SUMMARY

The present disclosure relates to the technical field of vehicle, and more particularly to an air purification apparatus, a method of controlling the air purification apparatus, a device of controlling the air purification apparatus and a vehicle using the air purification apparatus.

In order to overcome the problems existing in the related art, the present disclosure provides an air purification apparatus, a control method, a device and a vehicle to enhance the purification effect and overall aesthetics of the air purification apparatus.

According to a first aspect of the present disclosure, an air purification apparatus is provided, which is applied to a vehicle, and includes: a main body and a solar module, wherein the solar module covers at least a portion of the main body and connects the main body, for providing power to the main body, the main body is assembled on a sunroof of the vehicle, and includes a first passage connected with the sunroof of the vehicle, and the air purification apparatus further includes a cover plate that is slidably assembled with the main body, the cover plate is capable of sliding along the main body to open or close the first passage, and the main body further includes a purification module, an air inlet module and an air outlet module, an air inlet passage of the air inlet module is capable of connecting the purification module and outside of the vehicle to receive or obtain (e.g., inhale) air from the outside of the vehicle and purify it, and an air outlet passage of the air outlet module is capable of connecting the inside and the outside of the vehicle to discharge air inside the vehicle.

In some embodiments, the main body includes a first side surface and a second side surface disposed in opposite to each other, the first side surface is provided with an air inlet connected with the air inlet passage, and the second side is provided with an air outlet connected with the air outlet passage.

In some embodiments, a position of the air inlet corresponds to that of the air outlet, and a cross-sectional area of the air inlet is the same as that of the air outlet.

In some embodiments, a plurality of air inlets are distributed in an array on the first side surface, and a plurality of air outlets are distributed in an array on the second side surface.

In some embodiments, a cover area of the cover plate is larger than or equal to a cross-sectional area of the first passage, such that the cover plate is capable of opening or closing the first passage when the cover plate slides along the main body.

In some embodiments, the main body further includes a rail disposed above an upper surface of the solar module, and the cover plate is slidably assembled with the rail, to cover at least a portion of at least one of the solar module and the first passage.

In some embodiments, the cover plate includes a light transmitting glass.

In some embodiments, the apparatus further includes a sealing element surrounding the main body and disposed between the sunroof of the vehicle and the main body.

In some embodiments, the sealing element includes an elastic structure.

According to a second aspect of the present disclosure, a method of controlling an air purification apparatus is provided, and includes:

receiving a start signal through a fresh air switch from a user; and sending a corresponding control signal to an air inlet module, a purification module and an air outlet module, such that the air inlet module, the purification module and the air outlet module work synchronously.

According to a third aspect of the present disclosure, a device of controlling an air purification apparatus is provided, and includes: an air inlet; an air outlet; an air inlet module; a purification module; an air outlet module;

a receiving unit, configured to receive a start signal through a fresh air switch from a user; and a sending unit, configured to send a corresponding control signal to an air inlet module, a purification module and an air outlet module, such that the air inlet module, the purification module and the air outlet module work synchronously.

In some embodiments, a position of the air inlet corresponds to the position of the air outlet, and a cross-sectional area of the air inlet is the same as the cross-sectional area of the air outlet.

According to a fourth aspect of the present disclosure, a computer readable storage medium is provided, on which computer instructions are stored, wherein, when the computer instructions are executed by a processor, the steps of the method above is realized.

According to a fifth aspect of the present disclosure, a system is provided and comprises a processor; and a peripheral controller coupled to the processor, the processor adapted to access data from the peripheral controller, the peripheral controller controlling an air purification apparatus, applied to a vehicle, including: a main body and a solar module, wherein the solar module covers at least a portion of the main body and connects the main body, for providing power to the main body, the main body is assembled on a sunroof of the vehicle, and includes a first passage connected with the sunroof of the vehicle, and the air purification apparatus further includes a cover plate that is slidably assembled with the main body, the cover plate is capable of sliding along the main body to open or close the first passage, and the main body further comprises a purification module, an air inlet module and an air outlet module, an air inlet passage of the air inlet module is capable of connecting the purification module and outside of the vehicle to receive or obtain (e.g., inhale) air from the outside of the vehicle and purify it, and an air outlet passage of the air outlet module is capable of connecting the inside and the outside of the vehicle to discharge air inside the vehicle.

In some embodiments, the main body further comprises a first side surface and a second side surface disposed opposite to each other, the first side surface is provided with an air inlet connected with the air inlet passage, and the second side surface is provided with an air outlet connected with the air outlet passage.

In some embodiments, a position of the air inlet corresponds to the position of the air outlet, and a cross-sectional area of the air inlet is the same as the cross-sectional area of the air outlet.

In some embodiments, a plurality of air inlets are distributed in an array on the first side surface, and a plurality of air outlets are distributed in an array on the second side surface.

In some embodiments, a cover area of the cover plate is larger than or equal to a cross-sectional area of the first passage, such that the cover plate is capable of opening or closing the first passage when the cover plate slides along the main body.

In some embodiments, the main body further includes a rail disposed above an upper surface of the solar module, and the cover plate is slidably assembled with the rail, to cover at least a portion of at least one of the solar module and the first passage.

According to a sixth aspect of the present disclosure, a vehicle is provided, which includes a vehicle body and the air purification apparatus above, wherein a sunroof is provided on the vehicle body, and the air purification apparatus is disposed outside the vehicle and covers the sunroof.

It should be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of the present disclosure, illustrate embodiments consistent with the disclosure, together with the description, serve to explain the principles of the disclosure.

DETAILED DESCRIPTION

Reference will now be made in detail to some embodiments, examples of which are illustrated in the accompanying drawings. The following description refers to the accompanying drawings in which the same numbers in different drawings represent the same or similar elements unless otherwise represented. The implementations set forth in the following description of some embodiments do not represent all implementations consistent with the present disclosure. Instead, they are merely examples of apparatuses and methods consistent with aspects related to the disclosure as recited in the appended claims.

The inventors of the present disclosure have recognized that, in order to improve the air quality inside a vehicle, an air purification apparatus is usually installed on the seat or the front console of the vehicle, wherein the air purification apparatus is connected with the vehicle power source, and the air quality is improved by circulating and purifying the air inside the vehicle. First, the air purification apparatus in the related art circulates and purifies the air inside the vehicle, which easily causes accumulation of harmful substances, so it is difficult to achieve the desired air quality; Second, the installation position of the air purification apparatus in the related art is limited by the internal structure of the vehicle. For example, when the air purification apparatus is installed on the vehicle seat, the air flow is easily blocked by the structure of the seat and the like, so the air flow effect and the purification quality are reduced. In addition, the air purification apparatus in the related art may need to be connected to the vehicle power source, which occupies the vehicle power resource and increases the complexity of the connecting circuit, and influences the overall aesthetics.

In order to solve the above technical problems, various embodiments of the present disclosure provided an air purification apparatus, which is described as follows.

Figure 1:
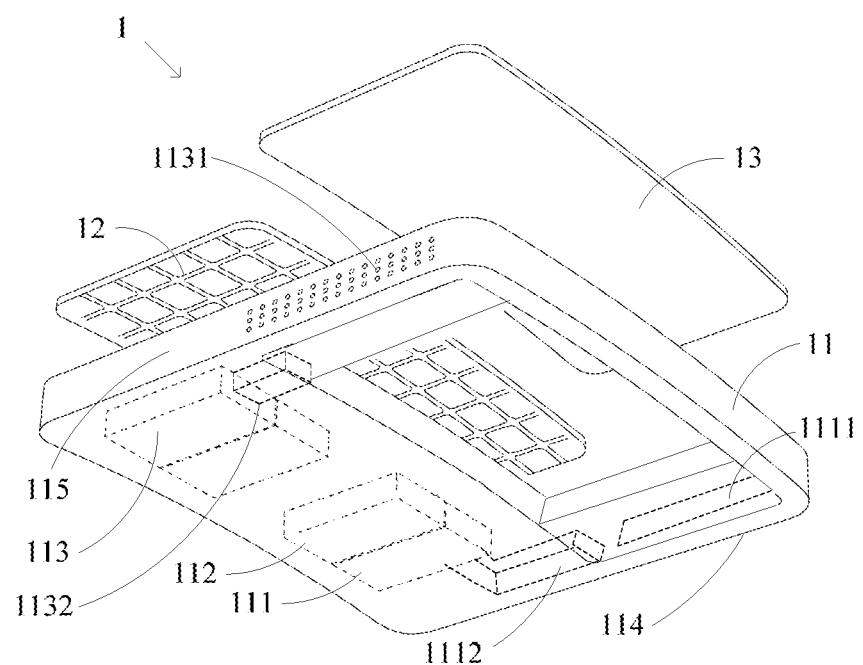
FIG. 1 is a structural schematic diagram of an air purification apparatus according to some embodiments.

FIG. 1 is a structural schematic diagram of an air purification apparatus according to some embodiments. As shown in FIG. 1, the air purification apparatus is applied to a vehicle, and includes: a main body 11 and a solar module 12, wherein the solar module 12 covers at least a portion of the main body 11 and connects to the main body 11, for providing power to the main body 11. Providing power for the work of the main body 11 by the solar module 12 saves vehicle power source, and reduces connection lines, thereby improving the overall aesthetics of the air purification apparatus 1 and the inside of the vehicle.

The main body 11 further includes a purification module 112, an air inlet module 111 and an air outlet module 113. An air inlet passage 1112 of the air inlet module 111 connects the purification module 112 and the outside of the vehicle, to receive or obtain (e.g., inhale) air from the outside of the vehicle and purify the received air. An air outlet passage 1132 of the air outlet module 113 is able to connect the inside and the outside of the vehicle, to discharge the air from the vehicle.

It is noted that the various device components, units, blocks, or portions may have modular configurations, or are composed of discrete components, but nonetheless may be referred to as "modules" in general. In other words, the "modules" or "units" referred to herein may or may not be in modular forms.

Figure 2:
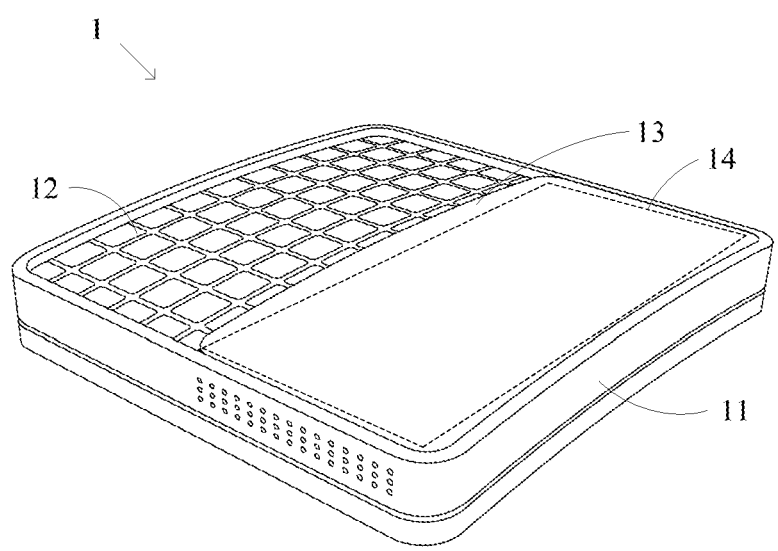
FIG. 2 is a structural schematic diagram of an air purification apparatus according to some embodiments.

The main body 11 is assembled on a sunroof of the vehicle, and includes a first passage 14 connected with the sunroof of the vehicle (see, e.g., FIG. 2). The air purification apparatus 1 further includes a cover plate 13 that is slidably assembled with the main body 11, and the first passage 14 can be opened or closed by the sliding of the cover plate 13 along the main body 11.

By providing the air inlet module 111 and the air outlet module 113 that connect with the outside of the vehicle for the main body 11 of the air purification apparatus 1, the purification module 112 of the main body 11 may receive or obtain (e.g., inhale) the air outside the vehicle, purify the received air, and discharge the less clean air from the vehicle, thereby improving the purification effect. In addition, the air purification apparatus 1 is installed outside corresponding to the sunroof of the vehicle, the first passage 14 of the main body 11 is connected with the sunroof, and the switch of the first passage 14 is controlled by the sliding of the cover plate 13, such that the purification effect is enhanced in virtue of the airflow advantage when the first passage 14 is closed, and the first passage 14 is connected with the sunroof when the first passage 14 is opened, so as to use the sunroof when the outside air of the vehicle is good.

Since air flow has a direct influence on the purification effect of the air purification apparatus 1, the present disclosure provides improvement on the setting of the air inlet module 111 and the air outlet module 113 that influence the air flow:

Specifically, the main body 11 of the air purification apparatus 1 may include a first side surface 114 and a second side surface 115 disposed opposite to each other. The first side surface 114 is provided with an air inlet 1111 connected with the air inlet passage 1112, and the second side surface 115 is provided with an air outlet 1131 connected with the air outlet passage 1132. The air inlet 1111 and the air outlet 1131 are disposed on opposite sides of the main body 11, thereby avoiding structural interference between the air inlet passage 1112 and the air outlet passage 1132, and simplifying the structures of the air inlet module 111 and the air outlet module 113, such that the flow efficiency and purification effect of the air are further enhanced. Alternatively, the air inlet 1111 and the air outlet 1131 may be disposed on other sides of the main body 11, which can be determined by considering the realization of effects of the air intake and air outlet, and to which the disclosure is not limited.

In some embodiments, the position of the air inlet 1111 corresponds to that of the air outlet 1131, and the cross-sectional areas of them are the same. By such arrangement, on the one hand, the air inlet 1111 and the air outlet 1131 are structurally symmetrical, thereby improving the aesthetics of the air purification apparatus 1, and on the other hand, the air inlet position of the air inlet 1111 and the air outlet position of the air outlet 1131 are symmetrical and have the same cross-sectional area, which increases the controllability of the air flow direction and the air flow rate.

In some embodiments, there may be a plurality of air inlets 1111 and the air outlets 1131, and the external aesthetics of the air purification apparatus 1 is improved by the plurality of small air inlets 1111 and air outlets 1131. In addition, the air inlets 1111 may be distributed in an array on the first side surface 114, and the air outlets 1131 may be distributed in an array on the second side surface 115. The structure aesthetic of the air purification apparatus 1 is further raised by distributing in arrays of the air inlets 1111 and the air outlets 1131.

Since the main body 11 is assembled on the sunroof 21 of the vehicle 2 (see, e.g., FIG. 7), and includes the first passage 14 connected with the sunroof 21 of the vehicle 2. In order to cooperate with the use of the sunroof 21 of the vehicle 2 and the first passage 14, the air purification apparatus 1 is further provided with a cover plate 13 that is slidably assembled with the main body 11, and the first passage 14 can be opened or closed by the sliding of the cover plate 13 along the main body 11. The structure and arrangement of the cover plate 13 described above may be exemplarily illustrated by the following embodiments.

Figure 3:
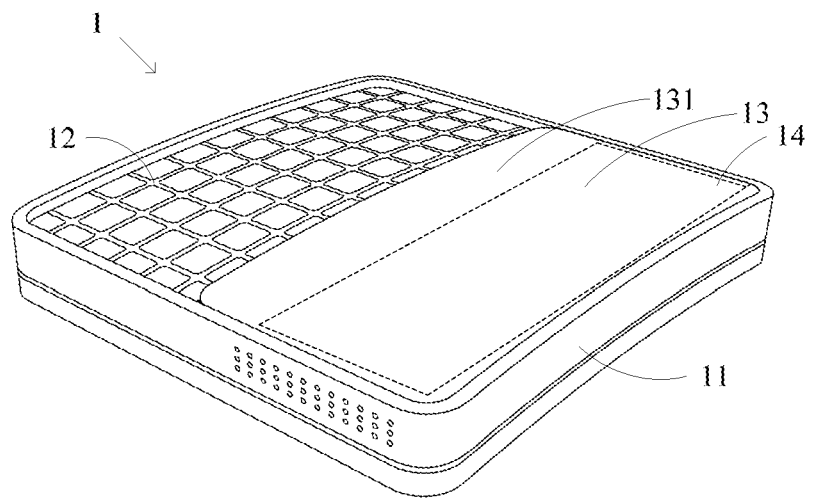
FIG. 3 is a schematic structural of an air purification apparatus according to some embodiments.

In some embodiments, the cover area of the cover plate 13 is larger than or equal to the cross-sectional area of the first passage 14, such that the cover plate 13 may open or close the first passage 14 when the cover plate 13 slides along the body 11. When the cover area of the cover plate 13 is equal to the cross-sectional area of the first passage 14, as shown in FIG. 2, and when the cover plate 13 slides along the main body 11 to the first passage 14, the first passage 14 is just covered to be closed. The above structure reduces the space of the air purification apparatus 1 occupied by the cover plate 13 under the premise of ensuring the function of the cover plate 13. When the cover area of the cover plate 13 is larger than the cross-sectional area of the first passage 14, as shown in FIG. 3, and when the cover plate 13 slides to the first passage 14, not only the first passage 14 is covered, but also a remaining portion 131 of the cover plate 13 that is assembled with other structures of the main body 11 is formed. The assembly of the remaining portion 131 and the main body 11 may increase the installation stability of the cover plate 13, and reduce the difficulty of assembling the cover plate 13.

In the above embodiment, the main body 11 may further include a slide rail (Not shown) which is disposed above the upper surface of the solar module 12. The first passage 14 of the main body 11 is disposed side by side with the solar module 12, and the cover plate 13 is slidably assembled with the slide rail, so as to cover at least a portion of at least one of the solar module 12 and the first passage 14. The slide rail is disposed above the upper surface of the solar module 12, and the space above the solar module 12 is used as the move space for the cover 13 when the cover 13 leaves the first passage 14, such that the structure of the air purification apparatus 1 is compact, which improves the space utilization rate. It should be noted that the cover plate 13 may include a light transmitting glass or other light transmitting materials, which may be determined by considering no influence on the operation of the solar module 12, and to which the disclosure does not limit.

Figure 4:
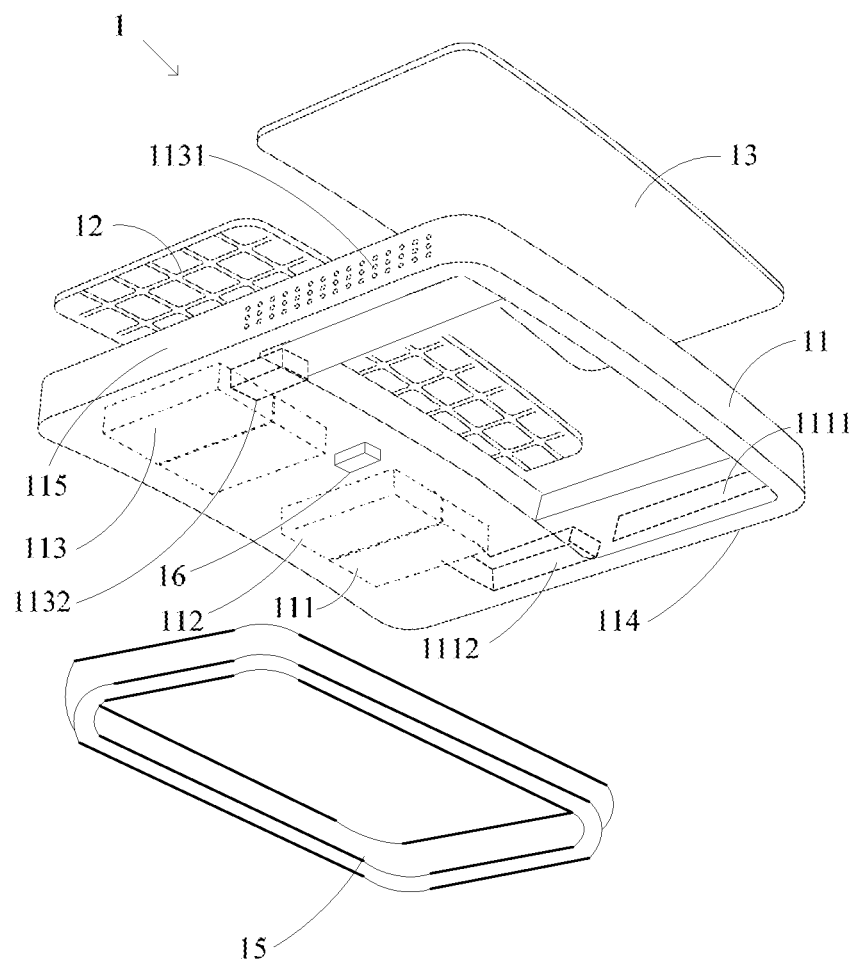
FIG. 4 is a structural schematic diagram of an air purification apparatus according to some embodiments.

In addition, as shown in FIG. 4, the air purification apparatus 1 may further include: a sealing element 15 surrounding the main body 11 and disposed between the sunroof of the vehicle and the main body 11, to form a sealing assembly between the main body 11 and the sunroof of the vehicle, so as to prevent impurity such as rainwater, sand and the like entering the inside of the vehicle through the gap between the main body 11 and the sunroof, wherein the sealing member 15 may be an elastic structure, to form an elastic assembly between the air purification apparatus 1 and the vehicle, thereby increasing the installation stability of the air purification apparatus 1 during running of the vehicle, and avoiding damage due to bumping of the vehicle.

Figure 5:
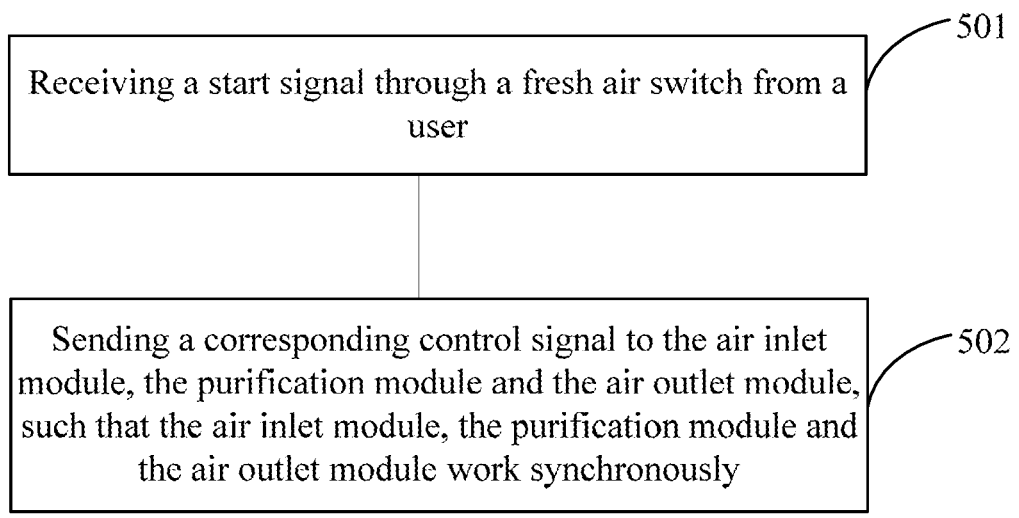
FIG. 5 is a flowchart showing a method of controlling an air purification apparatus according to some embodiments.

The present disclosure further provides a method of controlling the air purification apparatus above. FIG. 5 is a flowchart showing a method of controlling the air purification apparatus above according to some embodiments. The air purification apparatus 1 described above may further include a fresh air switch 16 as shown in FIG. 4, and the method may be implemented by the following steps:

in step 501, receiving a start signal via the fresh air switch 16 from a user; and in step 502, sending a corresponding control signal to air inlet module, purification module and air outlet module, such that the air inlet module, the purification module and the air outlet module work synchronously.

The user may start the air inlet module, the purification module and the air outlet module of the air purification apparatus through the fresh air switch, to make the air inlet module and the purification module and the air outlet module work synchronously, to receive the outside air of the vehicle, purify it, then deliver the purified air into the vehicle, and discharge the exhaust air from the vehicle at the same time. The above method of controlling the air purification apparatus above is easily operated, which improves the air quality inside the vehicle and the convenience of the user.

Figure 6:
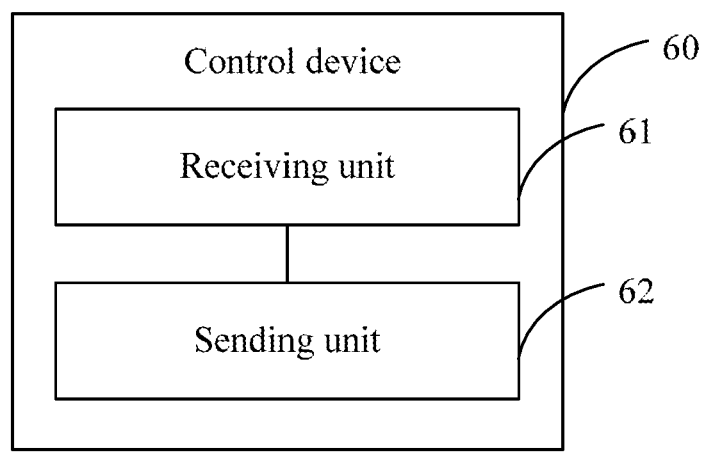
FIG. 6 is a structural block diagram of a device of controlling an air purification apparatus according to some embodiments.

The present disclosure further provides a device of controlling the air purification apparatus above. FIG. 6 is a structural block diagram of a control device according to some embodiments of the present disclosure. As shown in FIG. 4, the above air purification apparatus 1 may further include a fresh air switch 16, and the control device 60 includes a receiving unit 61 and a sending unit 62, wherein the receiving unit 61 is configured to receive a start signal sent through the fresh air switch 16 from a user; and the sending unit 62 is configured to send a corresponding control signal to air inlet module, purification module and air outlet module, such that the air inlet module, the purification module and the air outlet module work synchronously.

The air inlet module, the purification module and the air outlet module of the air purification apparatus may be started by the fresh air switch 16, to make that the air inlet module and the purification module and the air outlet module work synchronously, to receive the outside air of the vehicle and purify it, then deliver the purified air into the vehicle, and discharge the less clean air from the vehicle. The above device of controlling the air purification apparatus above is easily operated, which improves the air quality inside the vehicle and the convenience of the user.

Figure 7:
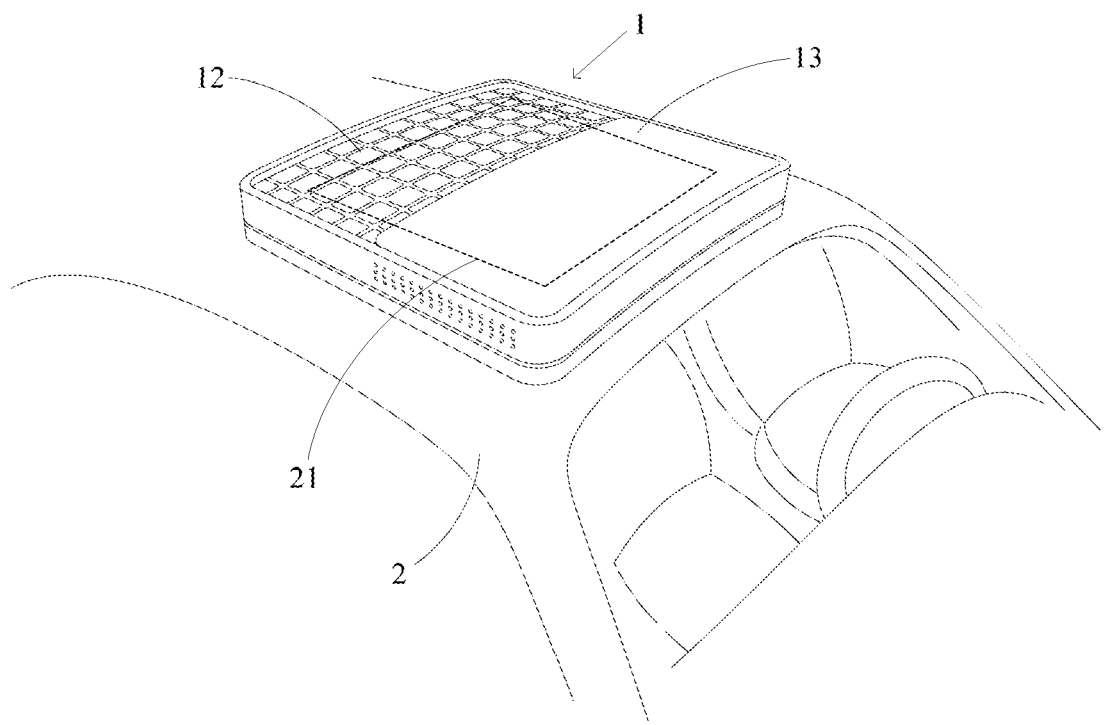
FIG. 7 is a structural schematic diagram of a vehicle according to some embodiments.

The present disclosure further provides a vehicle 2, as shown in FIG. 7, and the vehicle 2 includes a vehicle body and the above-described air purification apparatus 1. A sunroof 21 is disposed on the vehicle body, and the air purification apparatus 1 is disposed outside the vehicle 2 and covers the sunroof 21. The above-described structural arrangement not only reduces the internal space of the vehicle 2 occupied by the air purification apparatus 1, but also improves the purification effect and the purification efficiency of the vehicle 2.

Figure 8:
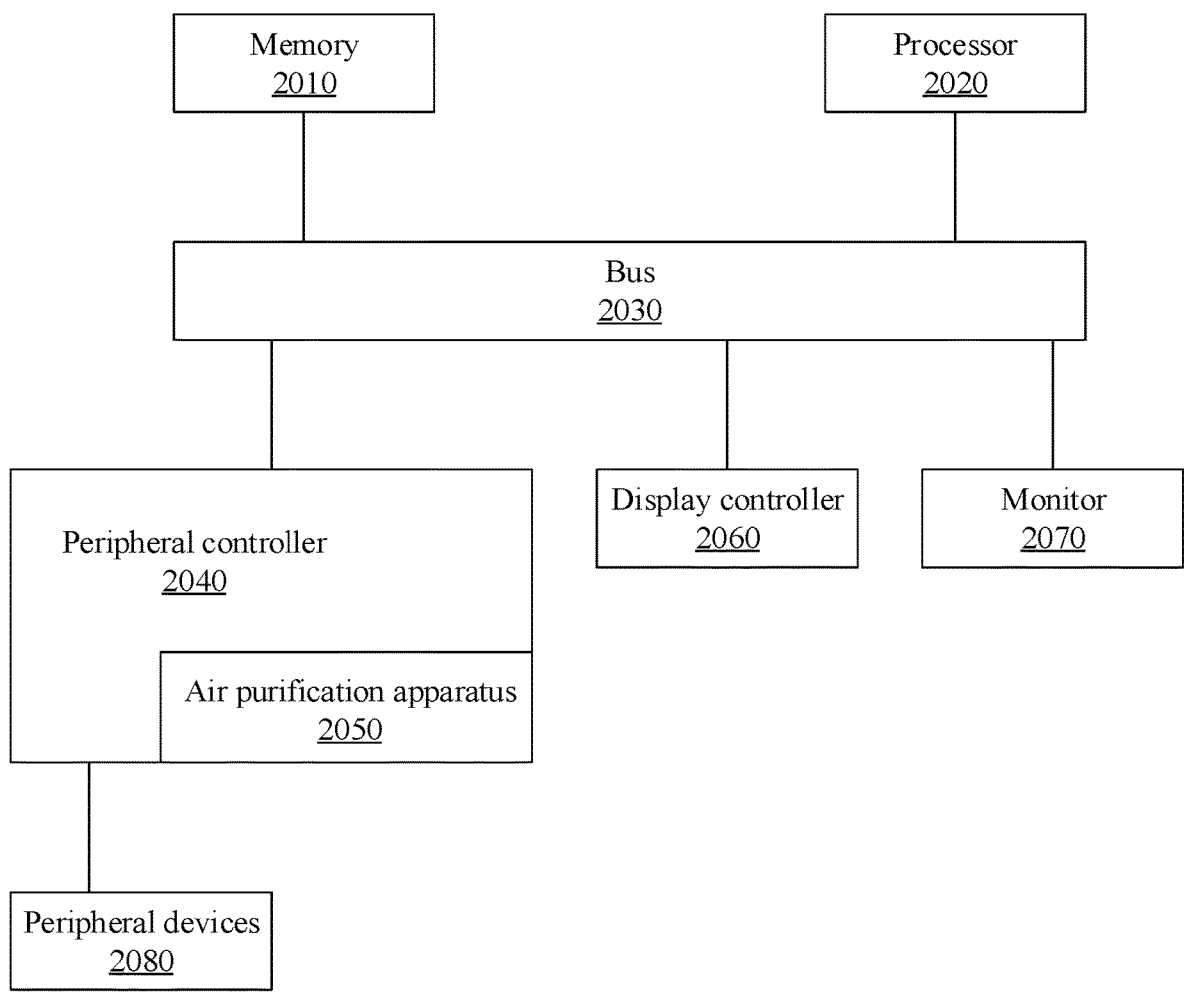
FIG. 8 is a schematic diagram of a system wherein a peripheral controller controls an air purification apparatus and is coupled to a processor that is adapted to access data from the peripheral controller according to some embodiments.

FIG. 8 is a schematic diagram that illustrates a system 2000 wherein a peripheral controller 2040 is configured to control an air purification apparatus 2050 similar to the air purification apparatus described above. In FIG. 8, peripheral controller 2040 is coupled to processor 2020 via a serial or parallel bus 2030. Processor 2020 is adapted to access data from peripheral controller 2040 via bus 2030. Memory 2010, and display controller 2060, may also be coupled to peripheral controller 2040 via bus 2030. Monitor 2070 may also be coupled to display controller 2060. Other peripheral devices 2080, such as a mouse, CD-ROM and video players, may also be coupled to peripheral controller 2040.

In some embodiments, there is also provided a non-transitory computer readable storage medium including instructions, such as a memory including instructions. The instructions are executable by a processor of the above apparatus to perform the above method. For example, the non-transitory computer readable storage medium may be a read only memory (ROM), a random-access memory (RAM), a compact disc read only memory (CD-ROM), a magnetic tape, a floppy disk, an optical data storage device, and the like.

At least some of the embodiments of the present disclosure can have one or more of the following advantages: a solar module connected with the main body for the air purification apparatus, to provide power source for the main body, reduces complicated power lines, and is energy-saving and environmentally friendly. The air inlet module and the air outlet module are also provided for the main body of the air purification apparatus, such that the purification module of the main body may inhale the air outside the vehicle, purify it, and discharge the less clean air from the vehicle, thereby improving the purification effect. In addition, the air purification apparatus is installed outside the sunroof of the vehicle, the first passage of the main body is connected with the sunroof, and the switch of the first passage is controlled by the sliding of the cover plate. When the first passage is closed, the purification effect is enhanced in virtue of the airflow advantage, and when the first passage is opened, the first passage is connected to the sunroof, so as to easily use the sunroof when the outside air of the vehicle is good.

In the present disclosure, it is to be understood that the terms "lower," "upper," "center," "longitudinal," "transverse," "length," "width," "thickness," "upper," "lower," "front," "back," "left," "right," "vertical," "horizontal," "top," "bottom," "inside," "outside," "clockwise," "counter-clockwise," "axial," "radial," "circumferential," "column," "row," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the present disclosure, a first element being "on," "over," or "below" a second element may indicate direct contact between the first and second elements, without contact, or indirect through an intermediate medium, unless otherwise explicitly stated and defined.

Moreover, a first element being "above," "over," or "at an upper surface of" a second element may indicate that the first element is directly above the second element, or merely that the first element is at a level higher than the second element. The first element "below," "underneath," or "at a lower surface of" the second element may indicate that the first element is directly below the second element, or merely that the first element is at a level lower than the second feature. The first and second elements may or may not be in contact with each other.

In the description of the present disclosure, the terms "one embodiment," "some embodiments," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a Read-Only Memory (ROM), a Random-Access Memory (RAM), a Compact Disc Read-Only Memory (CD-ROM), a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures. For example, the devices can be controlled remotely through the Internet, on a smart phone, a tablet computer or other types of computers, with a web-based graphic user interface (GUI).

A computer program (also known as a program, software, software application, app, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. An air purification apparatus, applied to a vehicle, comprising: a main body and a solar module, wherein the solar module covers at least a portion of the main body and connects the main body, for providing power to the main body, the main body is assembled on a sunroof of the vehicle, and comprises a first passage connected with the sunroof of the vehicle, and the air purification apparatus further comprises a cover plate that is slidably assembled with the main body, the cover plate is capable of sliding along the main body to open or close the first passage, and the main body further comprises a purification module, an air inlet module and an air outlet module, an air inlet passage of the air inlet module is capable of connecting the purification module and outside of the vehicle to receive air from the outside of the vehicle and purify the received air and then deliver the purified air into the vehicle, an air outlet passage of the air outlet module is capable of connecting the inside and the outside of the vehicle to discharge air from inside the vehicle to outside the vehicle, and the air inlet module and the purification module and the air outlet module are capable of working synchronously.

2. The air purification apparatus according to claim 1, wherein the main body further comprises a first side surface and a second side surface disposed opposite to each other, the first side surface is provided with an air inlet connected with the air inlet passage, and the second side surface is provided with an air outlet connected with the air outlet passage.

3. The air purification apparatus according to claim 2, wherein a position of the air inlet corresponds to a position of the air outlet, and a cross-sectional area of the air inlet is the same as a cross-sectional area of the air outlet.

4. The air purification apparatus according to claim 2, wherein a plurality of air inlets are distributed in an array on the first side surface, and a plurality of air outlets are distributed in an array on the second side surface.

5. The air purification apparatus according to claim 1, wherein a cover area of the cover plate is larger than or equal to a cross-sectional area of the first passage, such that the cover plate is capable of opening or closing the first passage when the cover plate slides along the main body.

6. The air purification apparatus according to claim 5, wherein the main body further comprises a rail disposed above an upper surface of the solar module, and the cover plate is slidably assembled with the rail, to cover at least a portion of at least one of the solar module and the first passage.

7. The air purification apparatus according to claim 6, wherein the cover plate comprises a light transmitting glass.

8. The air purification apparatus according to claim 1, wherein the apparatus further comprises a sealing element surrounding the main body and disposed between the sunroof of the vehicle and the main body.

9. The air purification apparatus according to claim 8, wherein the sealing element comprises an elastic structure.

10. A method of controlling the air purification apparatus of claim 1, the method comprising:
receiving a start signal through a fresh air switch from a user; and
sending a corresponding control signal to the inlet module, the purification module and the air outlet module, such that the air inlet module, the purification module and the air outlet module work synchronously.

11. A device of controlling the air purification apparatus of claim 1, comprising:
an air inlet;
an air outlet;
the air inlet module;
the purification module;
the air outlet module;
a receiving unit, configured to receive a start signal through a fresh air switch from a user; and
a sending unit, configured to send a corresponding control signal to the air inlet module, the purification module and the air outlet module, such that the air inlet module, the purification module and the air outlet module work synchronously.

12. The device according to claim 11, wherein a position of the air inlet corresponds to a position of the air outlet, and a cross-sectional area of the air inlet is the same as a cross-sectional area of the air outlet.

13. A non-transitory computer readable storage medium storing computer instructions thereon for execution by a processor to realize the method of claim 10.

14. A vehicle comprising the air purification apparatus according to claim 1, and a vehicle body, wherein the sunroof is provided on the vehicle body, and the air purification apparatus is disposed outside the vehicle and covers the sunroof.

15. A system comprising:
a processor; and
a peripheral controller coupled to the processor, the processor adapted to access data from the peripheral controller, the peripheral controller configured to control an air purification apparatus, applied to a vehicle, comprising: a main body and a solar module, wherein the solar module covers at least a portion of the main body and connects the main body, for providing power to the main body,
the main body is assembled on a sunroof of the vehicle, and comprises a first passage connected with the sunroof of the vehicle, and the air purification apparatus further comprises a cover plate that slidably assembled with the main body, the cover plate is capable of sliding along the main body to open or close the first passage, and
the main body further comprises a purification module, an air inlet module and an air outlet module, an air inlet passage of the air inlet module is capable of connecting the purification module and outside of the vehicle to receive air from the outside of the vehicle and purify the received air and then deliver the purified air into the vehicle, an air outlet passage of the air outlet module is capable of connecting the inside and the outside of the vehicle to discharge air from inside the vehicle, and the air inlet module and the purification module and the air outlet module are capable of working synchronously.

16. The system according to claim 15, wherein the main body further comprises a first side surface and a second side surface disposed opposite to each other, the first side surface is provided with an air inlet connected with the air inlet passage, and the second side surface is provided with an air outlet connected with the air outlet passage.

17. The system according to claim 16, wherein a position of the air inlet corresponds to a position of the air outlet, and a cross-sectional area of the air inlet is the same as a cross-sectional area of the air outlet.

18. The system according to claim 16, wherein a plurality of air inlets are distributed in an array on the first side surface, and a plurality of air outlets are distributed in an array on the second side surface.

19. The system according to claim 15, wherein a cover area of the cover plate is larger than or equal to a cross-sectional area of the first passage, such that the cover plate is capable of opening or closing the first passage when the cover plate slides along the main body.

20. The system according to claim 19, wherein the main body further comprises a rail disposed above an upper surface of the solar module, and the cover plate is slidably assembled with the rail, to cover at least a portion of at least one of the solar module and the first passage.

* * * * *